US011921855B2

(12) United States Patent
Cheng et al.

(10) Patent No.: US 11,921,855 B2
(45) Date of Patent: Mar. 5, 2024

(54) ANTI-MALWARE ADAPTOR FOR REMOVABLE STORAGE DEVICES

(71) Applicant: TXOne Networks Inc., Taipei (TW)

(72) Inventors: Wen-Hao Cheng, Taipei (TW); Hsiao-Pei Tien, Taipei (TW); Pao-Han Lee, Taipei (TW)

(73) Assignee: TXOne Networks Inc., Taipei (TW)

( * ) Notice: Subject to any disclaimer, the term of this patent is extended or adjusted under 35 U.S.C. 154(b) by 341 days.

(21) Appl. No.: 17/403,111

(22) Filed: Aug. 16, 2021

(65) Prior Publication Data

US 2022/0366046 A1 Nov. 17, 2022

Related U.S. Application Data

(60) Provisional application No. 63/188,051, filed on May 13, 2021.

(51) Int. Cl.
G06F 21/56 (2013.01)
G05B 19/418 (2006.01)
G06F 13/16 (2006.01)
G06F 13/42 (2006.01)

(52) U.S. Cl.
CPC ..... *G06F 21/565* (2013.01); *G05B 19/41835* (2013.01); *G06F 13/1668* (2013.01); *G06F 13/4282* (2013.01); *G06F 21/566* (2013.01); *G06F 21/567* (2013.01); *G05B 2219/45103* (2013.01); *G06F 2213/0042* (2013.01); *G06F 2221/034* (2013.01)

(58) Field of Classification Search
CPC ............... G06F 21/565; G06F 13/1668; G06F 13/4282; G06F 21/566; G06F 21/567; G06F 2213/0042; G06F 2221/034; G06F 21/109; G06F 21/564; G06F 21/561; G05B 19/41835; G05B 2219/45103
See application file for complete search history.

(56) References Cited

U.S. PATENT DOCUMENTS

| 7,591,018 | B1 | 9/2009 | Lee | |
| 7,912,991 | B1 * | 3/2011 | Merry | G06F 3/0626 710/36 |
| 7,975,304 | B2 | 7/2011 | Lu | |
| 8,458,376 | B1 * | 6/2013 | Chen | G06F 1/266 710/5 |
| 8,881,293 | B1 | 11/2014 | Brucker et al. | |
| 2016/0299865 | A1 * | 10/2016 | Hetzler | G06F 13/4282 |

(Continued)

FOREIGN PATENT DOCUMENTS

JP 2009211524 9/2009

OTHER PUBLICATIONS

Agostino Cortesi, et al. "Static Analysis Techniques for Robotics Software Verification", 2013, 6 sheets, IEEE International Symposium on Robotics.

(Continued)

*Primary Examiner* — Abiy Getachew
(74) *Attorney, Agent, or Firm* — Beyer Law Group LLP

(57) ABSTRACT

An adaptor includes non-volatile memory that stores a scan engine. A removable storage device is connected to the adaptor, which in turn is connected to a host computer. Files being copied between the removable storage device and the host computer through the adaptor are scanned for malware using the scan engine.

18 Claims, 7 Drawing Sheets

(56) References Cited

U.S. PATENT DOCUMENTS

2020/0065488 A1\* 2/2020 Takezawa ................ G06F 3/00
2020/0218809 A1 7/2020 Lam

OTHER PUBLICATIONS

Avijit Mandal, et al. "A static analyzer for Industrial robotic applications", 2017, pp. 24-27, IEEE 28th International Symposium on Software Reliability Engineering Workshops.
Avijit Mandal, et al. "A Generic Static Analysis Framework for Domain-specific Languages", 2018, pp. 27-34, IEEE 23rd International Conference on Emerging Technologies and Factory Automation (ETFA).
Mu Zhang, et al. "Towards Automated Safety Vetting of PLC Code in Real-World Plants", 2019, 17 sheets, Proceedings—40th IEEE Symposium on Security and Privacy.
Scanning Tool (USB Device), Trend Micro Portable Security 3 Management Program Online Help/Enterprise/Online Help Center, 2 sheets [retrieved on Feb. 3, 2021], retrieved from the internet: https://docstrendmicro.com/en-us/enterprise/trend-micro-portable-security-3-management-program-online-help/introduction_001/trend-micro-portable.
Trend Micro—Security Software and Services, 2 sheets [retrieved on Feb. 3, 2021], retrieved from the internet: https://store.trendmicro.com/sotre/trendoem/en_US/pd/ThemeID.1268200/productID.179715700.
Extended European Search Report from European Application No. 22173394 dated Sep. 16, 2022.

\* cited by examiner

ANTI-MALWARE ADAPTOR FOR REMOVABLE STORAGE DEVICES

REFERENCE TO RELATED APPLICATION

This application claims the benefit of U.S. Provisional Application No. 63/188,051, filed on May 13, 2021, which is incorporated herein by reference in its entirety.

BACKGROUND OF THE INVENTION

1. Field of the Invention

The present invention is directed to inspecting files being copied between a host computer and a removable storage device for malware.

2. Description of the Background Art

Operational Technology (OT) security refers to securing industrial control systems, such as those used in manufacturing facilities, power plants, and other OT sites. In contrast to cybersecurity, which protects computers and information in general, OT security prevents tampering and unauthorized control of industrial control systems. Like cybersecurity, OT security is concerned with detecting and blocking malware, i.e., malicious code. However, the stakes are higher in OT security because malware infection of an industrial control system can result in physical injuries or even death. Consequently, some industrial control systems are not directly connected to the Internet.

An OT security issue arises when files are to be copied to and between industrial control systems. A popular way of copying files to an industrial control system is by removable storage devices, such as Universal Serial Bus (USB) storage devices. As part of OT security procedure, a USB storage device needs to be scanned for malware before allowing the USB storage device to be connected to a workstation or industrial equipment of an industrial control system.

One way of scanning a USB storage device for malware is to provide a dedicated scan box, such as a computer with a traditional scanner, at the entrance of an OT site. Visitors of the OT site (e.g., vendors, consultants, field engineers) are required to scan a USB storage device at the scan box before the USB storage device is allowed to be inserted to an industrial control system. A problem with using a dedicated scan box is that a USB storage device needs to be re-scanned after each insertion to an industrial control system, because the USB storage device may have been infected in-between insertions. Enforcing OT security by installing a special security driver on the industrial control system to check for scanned USB storage devices is problematic because special security drivers on an industrial control system may require validation for compliance with regulatory agencies or may void warranty.

Another way of scanning a USB storage device for malware is to use a special-purpose USB storage device with a built-in scanner, such as the Trend Micro™ USB Security product. A potential problem with this solution is that some visitors may be hesitant to copy proprietary files to such special-purpose USB storage device, preferring to use regular, ubiquitous USB storage devices.

SUMMARY

In one embodiment, an adaptor includes non-volatile memory that stores a scan engine. A removable storage device is connected to the adaptor, which in turn is connected to a host computer. Files being copied between the removable storage device and the host computer through the adaptor are scanned for malware using the scan engine.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Embodiments of the present invention are explained in the context of Universal Serial Bus (USB) storage devices and the Microsoft Windows™ operating system as examples. As can be appreciated, embodiments of the present invention are generally suitable for other removable storage devices and other operating systems.

Figure 1:
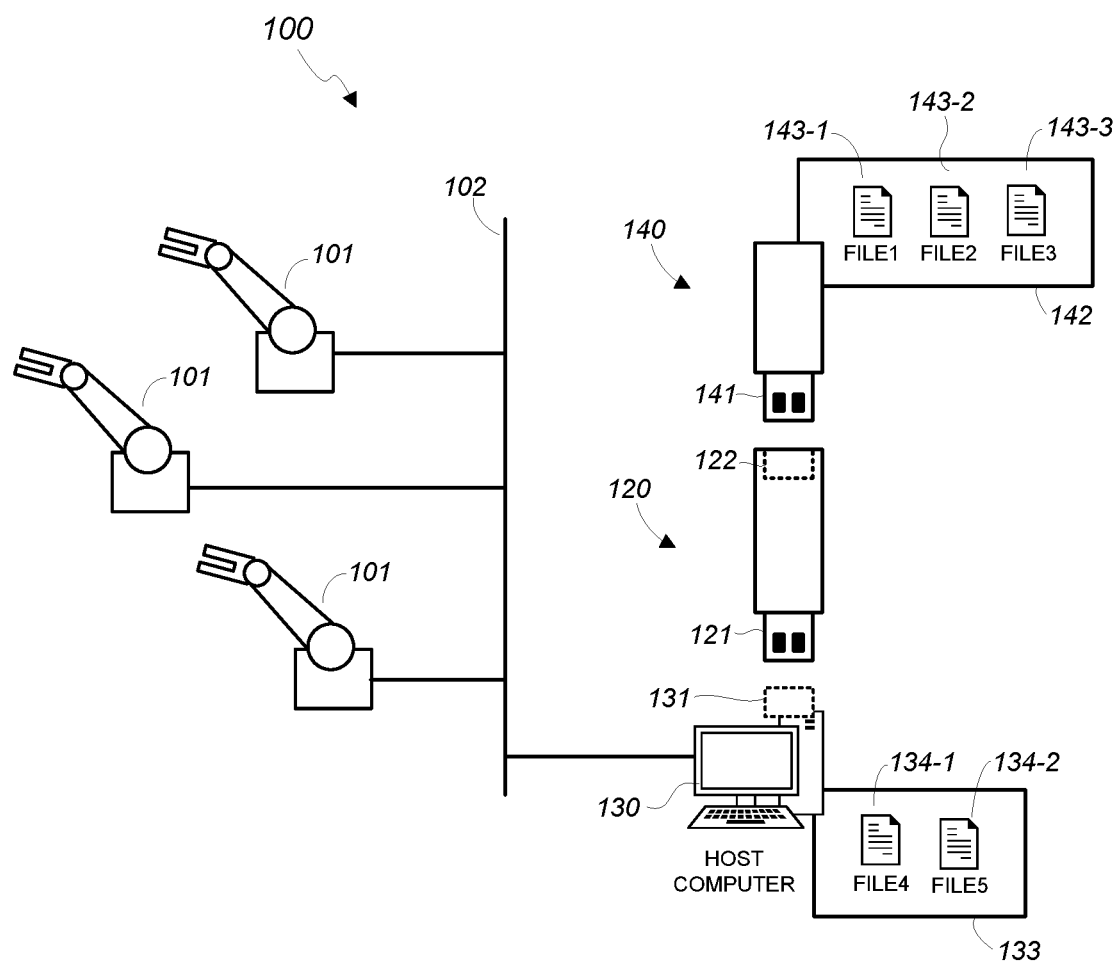
FIG. 1 shows a logical diagram of an industrial control system in accordance with an embodiment of the present invention.

FIG. 1 shows a logical diagram of an industrial control system (ICS) 100 in accordance with an embodiment of the present invention. The ICS 100 includes a host computer 130 (e.g., workstation, control module) that is used to control and monitor the operation of one or more industrial equipment 101. The host computer 130 includes a non-volatile storage device 133 that stores one or more files, which in the following examples include a file 134-1 ("FILE4") and a file 134-2 ("FILE5").

An industrial equipment 101 may be an industrial robot, process control device, automation equipment, manufacturing equipment, or other industrial equipment. The host computer 130 may communicate with the industrial equipment 101 over a computer network 102.

In the example of FIG. 1, the ICS 100 includes an anti-malware adaptor (AMA) 120 for moving files to and from the host computer 130. The AMA 120 is configured to control access to files stored in a removable storage device 140 and to facilitate scanning of files being copied between the host computer 130 and the removable storage device 140 for malware. In one embodiment, the AMA 120 has a male USB connector 121 on one end and a female USB connector 122 on another end. The USB connector 121 is configured to be removably connected to a female USB connector 131 of the host computer 130. A male USB connector 141 of the removable storage device 140 is configured to be removably connected to the USB connector 122.

The removable storage device 140 may be a commercially-available removable USB storage device, such as a so-called USB stick or USB flash memory. The removable storage device 140 has the male USB connector 141, which is configured to be removably connected to the female USB connector 122 of the AMA 120. As can be appreciated, the form factors of the AMA 120 and the removable storage device 140 do not necessarily have to be the same. Furthermore, the connectors 131, 121, 122, and 141 may vary depending on the associated interface standard.

The removable storage device 140 includes a non-volatile memory in the form of a flash memory 142. The flash memory 142 stores one or more files, which in the following examples include a file 143-1 ("FILE1"), a file 143-2 ("FILE2"), and a file 143-3 ("FILE3").

Figure 2:
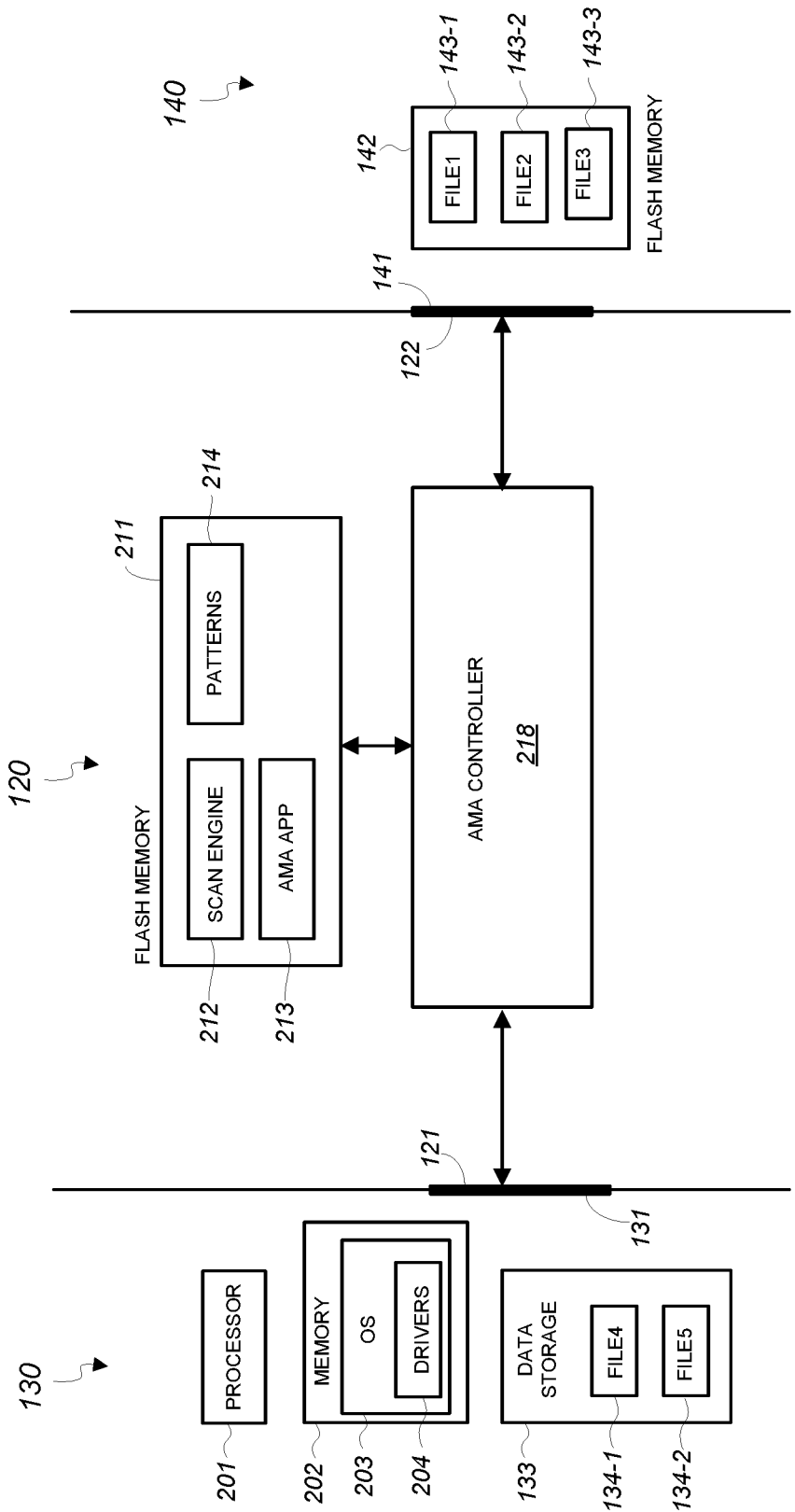
FIG. 2 shows a logical diagram of an anti-malware adaptor in accordance with an embodiment of the present invention.

FIG. 2 shows a logical diagram of the AMA 120 in accordance with an embodiment of the present invention. In the example of FIG. 2, the host computer 130 includes a hardware processor 201 (e.g., central processing unit (CPU)), a memory 202 (e.g., random access memory), and the data storage device 133 (e.g., hard drive, solid state drive, flash memory). The memory 202 stores an operating system 203, which includes kernel layer components and native drivers 204. In one embodiment, the operating system 203 is the Microsoft Windows™ operating system, and the drivers 204 include storage class drivers and storage port drivers that enable the Microsoft Windows™ operating system to recognize USB mass storage devices and control them as a drive with file system operations. The data storage device 133 may store a plurality of files, which in the following examples include the file 134-1 and the file 134-2.

In the example of FIG. 2, the removable storage device 140 comprises the flash memory 142, which in the following examples stores the file 143-1, the file 143-2, and the file 143-3. Other components of the removable storage device 140, such as a USB controller, are not shown for clarity of illustration.

In the example of FIG. 2, the AMA 120 comprises a non-volatile memory in the form of a flash memory 211 and an AMA controller 218. The AMA controller 218 may comprise a flash memory controller, a microcontroller, main memory, and other electrical circuits. In one embodiment, the AMA controller 218 is configured to screen access to the files stored in the removable storage device 140 and to facilitate malware scanning of files being copied between the host computer 130 and the removable storage device 140.

A host computer and a USB mass storage device may communicate using Small Computer System Interface (SCSI) commands. A SCSI command has a corresponding opcode. The SCSI standard defines several types of devices. Each type of device has a corresponding set of SCSI commands, which are referred to herein as "conventional SCSI commands" for that type. For each type of device, there are 256 opcodes that can be divided into three classes, namely Class 1, Class 2, and Class 3. Class 1 opcodes are "conventional storage-access SCSI opcodes"; Class 2 opcodes are "conventional non-storage-access SCSI opcodes"; and Class 3 opcodes are "non-conventional SCSI opcodes." For brevity, conventional SCSI commands with Class 1 opcodes are also referred to herein as "Class 1 commands," and conventional SCSI commands with Class 2 opcodes are also referred to herein as "Class 2 commands."

Class 1 commands are conventional SCSI commands that operate on the files and file system of the device. For a USB flash drive, Class 1 commands include READ10, WRITE10, FORMAT, etc. Class 2 commands are conventional SCSI commands that do not operate on the files or file system of the device. Class 3 opcodes are opcodes that are not specified in the SCSI standard for use with the device type. Examples of Class 3 opcodes for a USB flash drive include 0x06, 0x09, 0xC0-0xFF, etc.

Conventional programs use Class 1 commands and Class 2 commands to communicate with a USB mass storage device, such as the removable storage device 140. Vendor-specific programs may, in addition, use several Class 3 opcodes for "vendor-specific SCSI commands" to implement features that are specific to the vendor. The AMA controller 218 is configured to prevent direct transmission of Class 1 commands and vendor-specific SCSI commands between the host computer 130 and the removable storage device 140. This prevents conventional programs and vendor-specific programs that are not associated with the AMA 120 from accessing the files and file system of the removable storage device 140.

In one embodiment, an AMA app (i.e., application program) 213 is configured to communicate with the AMA controller 218 using the AMA's 120 vendor-specific SCSI commands, which are also referred to herein as "AMA SCSI commands." The AMA SCSI commands are in a specific format with specific patterns that are recognized by the AMA app 213 and the AMA controller 218. The AMA controller 218 translates AMA SCSI commands into corresponding conventional Class 1 commands to facilitate access to the files and filesystem of the removable storage device 140.

The AMA SCSI commands may use opcodes that are in the range for Class 3 opcodes of the removable storage device 140. The AMA controller 218 is configured to recognize an AMA SCSI command by checking the command's opcode, format, and pattern, e.g., by looking for a 4-byte magic number at a specific offset. In one embodiment, the AMA app 213 does not send Class 1 commands; the AMA app 213 only sends AMA SCSI commands and Class 2 commands.

As will be more apparent below, the AMA app 213 may be loaded and executed in the host computer 130. While running in the host computer 130, the AMA app 213 may send AMA SCSI commands to the AMA controller 218. The AMA SCSI commands are sent through the native drivers 204, which support a pass-through feature. The AMA controller 218 is configured to translate AMA SCSI commands to corresponding Class 1 commands that are understood by the removable storage device 140. The AMA controller 218 provides the corresponding Class 1 commands to the removable storage device 140. The removable storage device 140 responds to the Class 1 commands in accordance with the SCSI command standards. The AMA controller 218 converts the response from the removable storage device 140 to a custom response, which the AMA controller 218 forwards to the AMA app 213. The AMA app 213 understands the custom response and acts accordingly.

In one embodiment, only the components of the AMA 120 are expected to use the custom AMA SCSI commands and responses. As can be appreciated, the SCSI commands discussed herein may be replaced with other suitable communication protocol.

In a first embodiment of the AMA controller 218, the AMA controller 218 is configured as a USB compound device. Generally speaking, a USB compound device includes a USB hub and one or more USB mass storage devices. The hub functionality of the AMA controller 218 allows the removable storage device 140 to be connected to the host computer 130 through the AMA controller 218. The USB device functionality of the AMA controller 218 allows the host computer 130 to access the contents of the flash memory 211 of the AMA 120. The AMA controller 218 provides USB descriptors for the removable storage device 140 to the host computer 130. The USB descriptors of the removable storage device 140 inform the host computer 130 to use the native drivers 204 in communications with the AMA 120.

In the first embodiment of the AMA controller 218, each AMA SCSI command has a corresponding Class 1 command. The AMA controller 218 is configured to reply to Class 1 commands and non-AMA vendor-specific commands by sending a masqueraded response to the host computer 130. The response is "masqueraded" in that the response may indicate a successful or failed operation or acknowledgement despite the device 140 not performing the operations of the commands.

When the AMA app 213 sends an AMA SCSI command to access a file stored in the removable storage device 140, the AMA controller 218 translates the AMA SCSI command to its corresponding Class 1 command and passes the Class 1 command to the removable storage device 140. The AMA controller 218 receives a response of the removable storage device 140 to the Class 1 command. The AMA controller 218 converts the response into a custom response understood by the AMA app 213 and provides the custom response to the AMA app 213.

In a second embodiment of the AMA controller 218, the AMA controller 218 is configured to be a USB host to the removable storage device 140 and to be a USB device to the host computer 130. The AMA controller 218 may be implemented as a system on a chip (SoC), for example. The USB host functionality of the AMA controller 218 detects and identifies the USB devices connected to the AMA 120, which in this example is the removable storage device 140. The AMA controller 218 appears as a USB device to the host computer 130. The AMA controller 218 provides its USB descriptors to the host computer 130 to allow the host computer 130 to identify the AMA controller 218 (and hence the AMA 120) as a USB mass storage device. The USB descriptors of the AMA controller 218 inform the host computer 130 to use the native drivers 204 in communications with the AMA 120. The USB device functionality of the AMA controller 218 allows the host computer 130 to access the contents of the flash memory 211 of the AMA 120.

In the second embodiment of the AMA controller 218, the AMA 120 does not provide USB descriptors of the removable storage device 140 to the host computer 130, so that the operating system 203 and conventional programs on the host computer 130 are not aware of the presence of the removable storage device 140. When the USB device functionality of the AMA controller 218 receives a general Class 1 command from the host computer 130, the AMA controller 218 treats the Class 1 command as a command to access the flash memory 211 of the AMA 120. Only AMA SCSI commands, which are sent by the AMA app 213, are able to access the files and file system of the removable storage device 140.

In the second embodiment, an AMA SCSI command is interpreted by the AMA controller 218 as operations to the removable storage device 140, which may include sending a sequence of conventional SCSI commands (i.e., Class 1 and Class 2 commands) to the device 140. When the AMA app 213 sends an AMA SCSI command to access a file stored in the removable storage device 140, the USB device functionality of the AMA controller 218 receives the AMA SCSI command and performs corresponding operations to the removable storage device 140. The AMA controller 218, as the USB host, sends one or more conventional SCSI commands to the removable storage device 140 to perform the operation indicated by the AMA SCSI command. The AMA controller 218 receives the response of the removable storage device 140 and converts the response to a custom response that is understood by the AMA app 213. The USB device functionality of AMA controller 218 then sends the custom response to the host computer 130. In the host computer 130, the AMA app 213 receives the custom response by way of the native drivers 204.

In light of the present disclosure, one of ordinary skill will appreciate that the AMA 120 may be implemented a variety of ways without detracting from the merits of the present invention. For example, a commercial USB device vendor may implement the AMA 120 as described herein. The AMA 120 may also include additional well-understood components, such as firmware, glue logic, discrete components, etc.

In the example of FIG. 2, the flash memory 211 stores the AMA app 213, a scan engine 212, and malware patterns 214. The scan engine 212 may comprise instructions for scanning a file for malware. In one embodiment, the scan engine 212 scans a file for data that match one or more of the malware patterns 214. The scan engine 212 may scan a file for malware using a conventional pattern matching algorithm. The scan engine 212 may also be implemented using other conventional algorithms for scanning files for malware.

The AMA app 213 may comprise instructions for providing a user interface, sending and receiving files to and from the AMA 120, and initiating scanning of files to be copied between the removable storage device 140 and the host computer 130. In one embodiment, the AMA app 213 is provided as an executable file (see FIG. 3, 213). The AMA app 213 is launched to be executed by the hardware processor 201 of the host computer 130 when the AMA app 213 is activated by the user.

FIGS. 3-6 show screen shots that illustrate an example operation of the AMA 120 in accordance with an embodiment of the present invention. The screen shots are from a display screen of the host computer 130 running the Microsoft Windows™ operating system as an example. The removable storage device 140 is plugged to the AMA 120, which in turn is plugged to the host computer 130.

Figure 3:
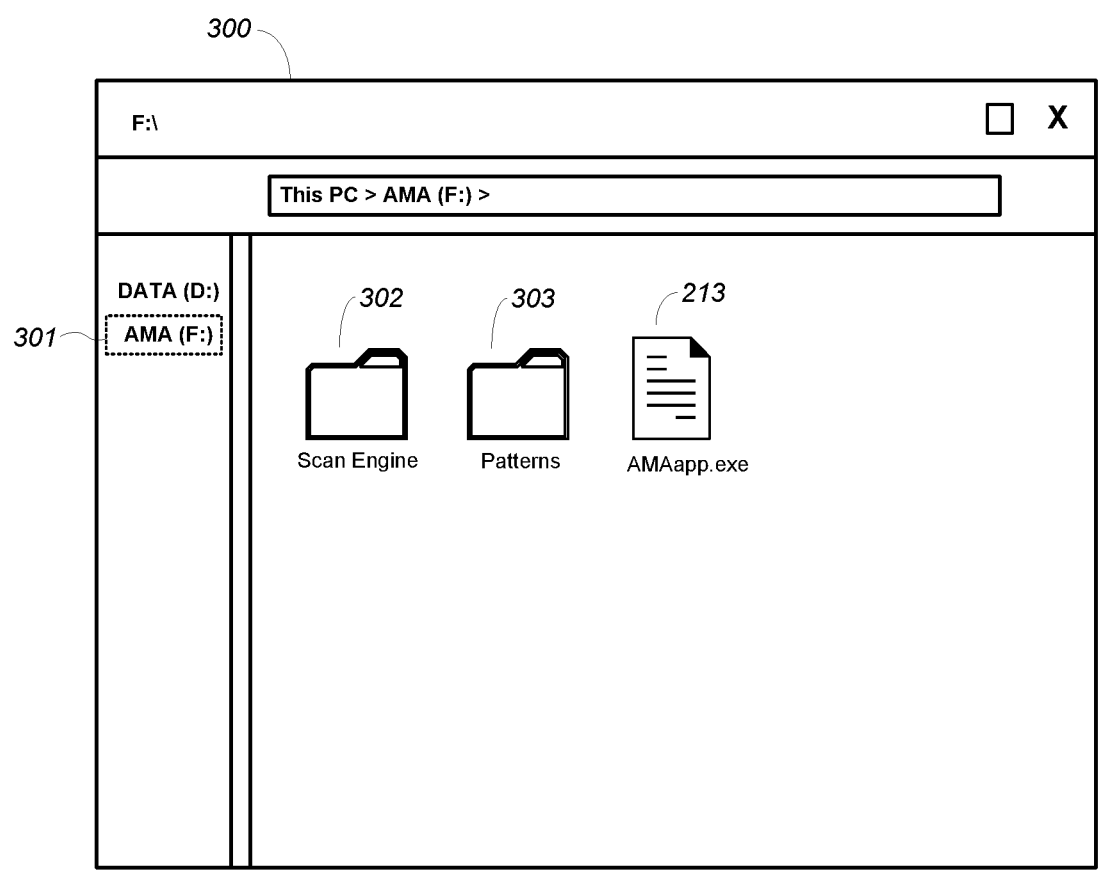
FIGS. 3-6 show screen shots that illustrate an example operation of an anti-malware adaptor in accordance with an embodiment of the present invention.

Referring first to FIG. 3, after the user plugged the AMA 120 to the host computer 130, a logical drive F (see 301) becomes visible in a Windows Explorer™ window 300. The logical drive F corresponds to the flash memory 211 of the AMA 120 (see FIG. 2, 211), which contains the scan engine 212, the patterns 214, and the AMA app 213. The AMA 120 is configured to present the flash memory 211 as storage of a conventional read-only USB device to the host computer 130, allowing the operating system 203 of the host computer 130 to see and read the contents of the flash memory 211 using its native drivers 204. In one embodiment, the scan engine 212 is stored in a directory 302, the patterns 214 are stored in a directory 303, and the AMA app 213 is provided as an executable file "AMAapp.exe". Note that the contents of the removable storage device 140 are not visible on the Windows Explorer™ window 300.

Figure 4:
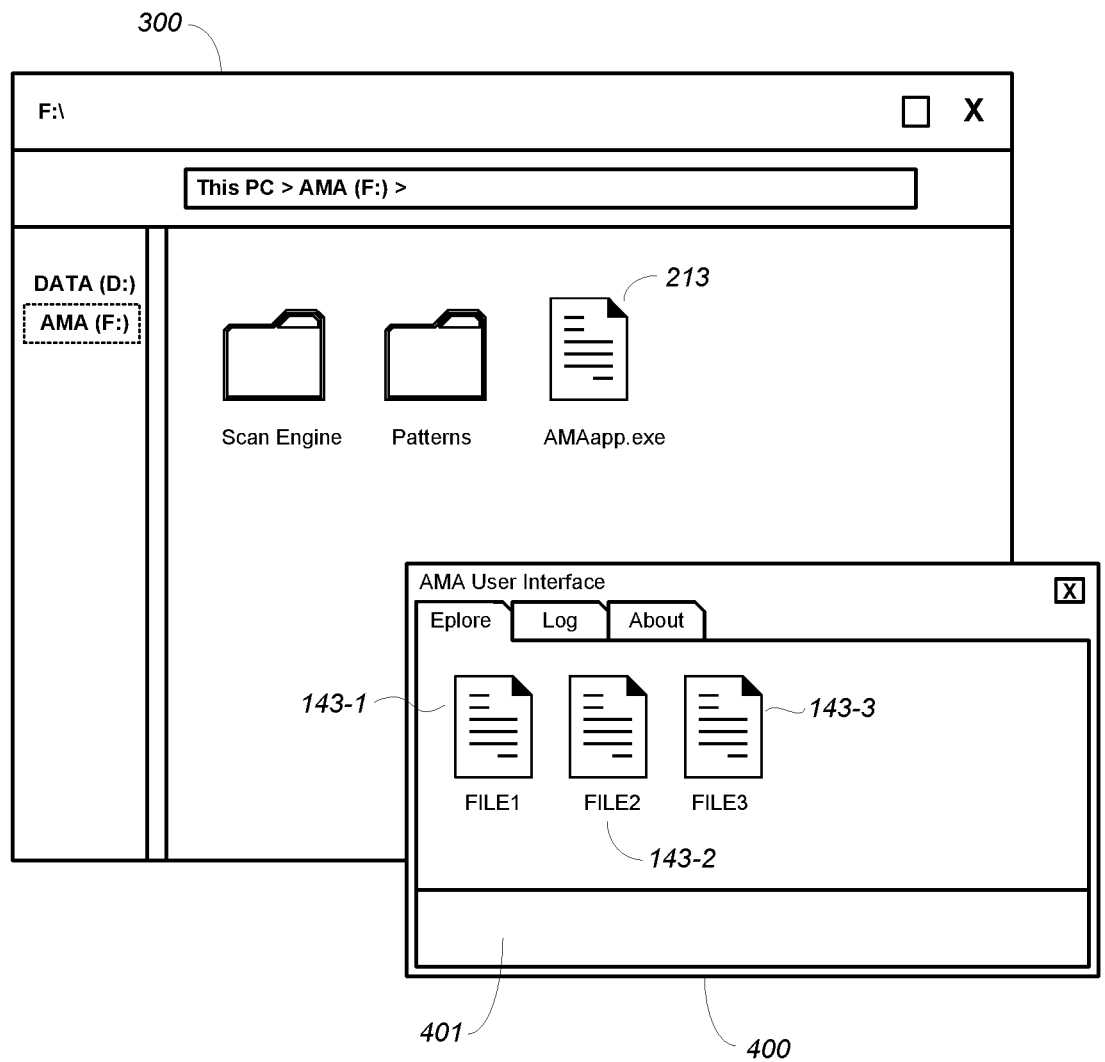

FIG. 4 shows a screen shot that follows FIG. 3 when the user activates the AMA app 213 to execute, such as by clicking on the executable file "AMAapp.exe". The activation loads the AMA app 213 in the memory 202 of the host computer 130 for execution by the processor 201 of the host computer 130. Upon execution, the AMA app 213 launches a user interface 400, which in one embodiment is a custom file explorer, and loads the scan engine 212 and the malware patterns 214 in the memory 202 of the host computer 130. The user interface 400 includes a tab ("Explore") for showing the contents of the flash memory 142 of the removable storage device 140 (see FIG. 2, 142), a tab ("Log") for showing log entries, and a tab ("About") for showing information about the AMA 120.

The AMA app 213 uses AMA SCSI commands to access the contents of the removable storage device 140. The AMA 120 receives the AMA SCSI commands, translates the AMA SCSI commands to corresponding Class 1 commands, and passes the Class 1 commands to the removable storage device 140. The removable storage device 140 provides one or more responses to the Class 1 commands. The AMA 120 receives the responses, converts the responses to custom responses, and forwards the custom responses to the AMA app 213. The AMA SCSI commands and responses may be passed between the AMA 120 and the AMA app 213 running on the host computer 130 through the native drivers 204, which as noted are the native drivers of the Microsoft Windows™ operating system.

The AMA app 213 reads the contents of the removable storage device 140 by way of AMA SCSI commands and responses as previously described. In the example of FIG. 4, the removable storage device 140 contains the files 143-1, 143-2, and 143-3. The AMA app 213 displays representations of the files 143-1, 143-2, and 143-3 on the user interface 400, allowing the user to see the contents of the removable storage device 140.

Figure 5:
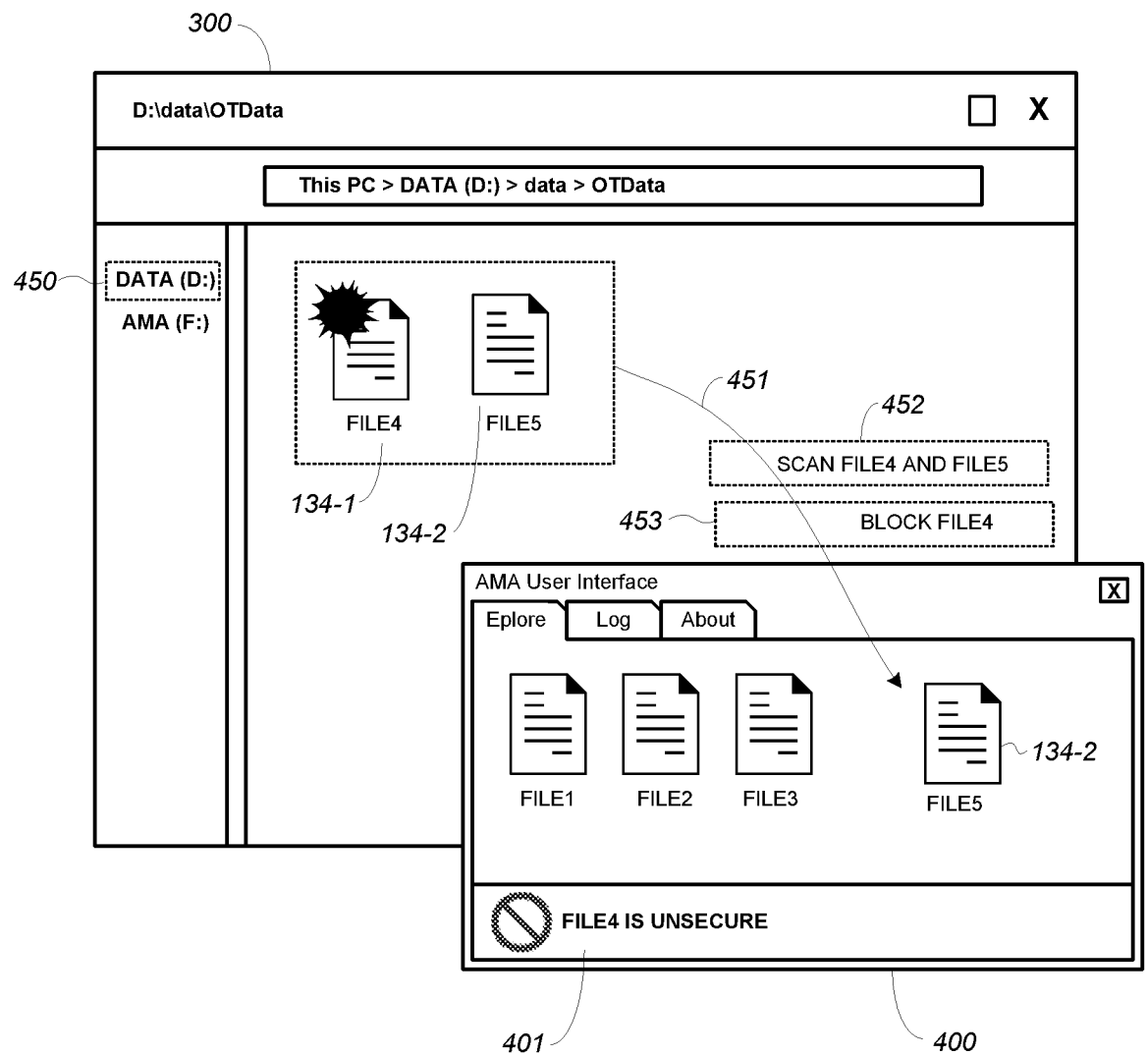

FIG. 5 shows a screen shot that follows FIG. 4 when the user selects a logical drive D of the storage device 133 of the host computer 130 (see FIG. 5, 450) and attempts to copy the files 134-1 and 134-2 to the removable storage device 140 (see arrow 451), such as by dragging the files 134-1 and 134-2 to the user interface 400. The AMA app 213 is configured to initiate copying to the removable storage device 140 one or more files that are dragged to the user interface 400. The AMA app 213, using the scan engine 212, is configured to scan for malware any file that is being copied between the host computer 130 and the removable storage device 140. Accordingly, in the example of FIG. 5, the AMA app 213 invokes the scan engine 212 to scan the files 134-1 and 134-2 for malware (see action 452). In the example of FIG. 5, the file 134-1 is detected to be malware, and accordingly is blocked by the AMA app 213 from being copied to the removable storage device 140 (see action 453). The AMA app 213 displays a message 401 on the user interface 400 to alert the user that the file 134-1 has been detected to be malware.

In the example of FIG. 5, the file 134-2 passes the malware scanning, and accordingly is copied by the AMA app 213 to the removable storage device 140 through the AMA 120. The AMA app 213 uses AMA SCSI commands to forward the file 134-2 to the AMA 120 by way of the native drivers 204. The AMA 120 receives the file 134-2, converts the AMA custom SCSI commands to corresponding Class 1 commands, which are natively recognized by the removable storage device 140. The removable storage device 140 stores the file 134-2 in the flash memory 142 in accordance with the received Class 1 commands.

Figure 6:
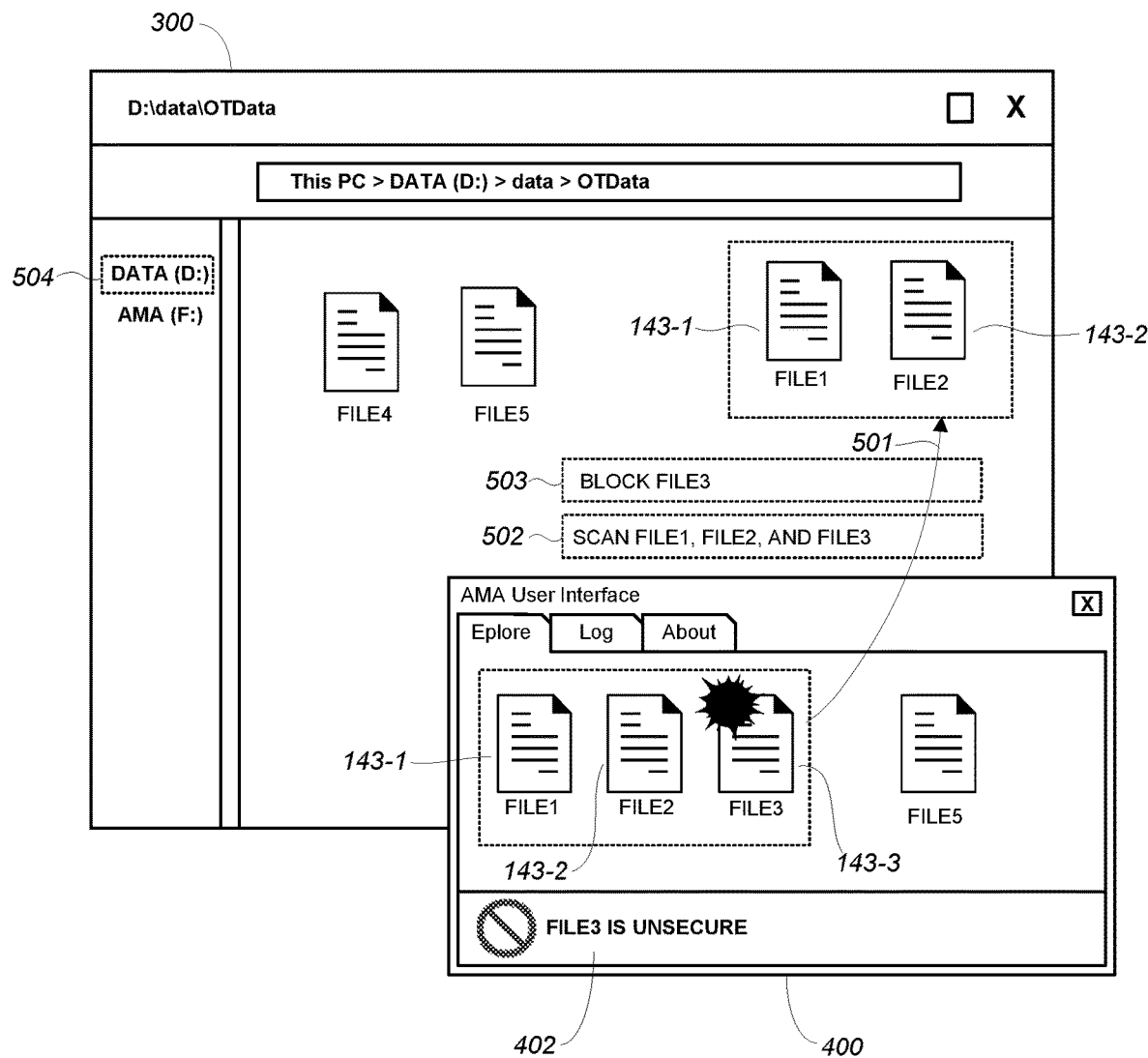

FIG. 6 shows a screen shot that follows FIG. 5 when the user attempts to copy the files 143-1, 143-2, and 143-3 from the removable storage device 140 to the logical drive D of the data storage device 133, such as by dragging the files 143-1, 143-2, and 143-3 from the user interface 400 to the window 300 (see arrow 501) with the logical drive D being selected (see FIG. 6, 504). The AMA app 213 is configured to initiate copying to the host computer 130 one or more files that are dragged from the user interface 400 to the window 300. The AMA app 213 is configured to scan for malware any file that is being copied between the host computer 130 and the removable storage device 140. Accordingly, the AMA app 213 reads the files 143-1, 143-2, and 143-3 from the removable storage device 140 using AMA SCSI commands as previously described and loads them into the memory 202 of the host computer 130. The AMA app 213 thereafter invokes the scan engine 212 to scan the files 143-1, 143-2, and 143-3 for malware in the memory 202 of the host computer 130 (see action 502).

In the example of FIG. 6, the file 143-3 is detected to be malware and accordingly is blocked by the AMA app 213 from being copied to the host computer 130 (see action 503). Blocking the copying of the file 143-3 includes removing the file 143-3 from the memory 202 of the host computer 130 and preventing subsequent copying of the file 143-3 through the AMA 120. This results in the file 143-3 being prevented from being stored in its intended destination in the host computer 130, which is the logical drive D in this example. The AMA app 213 displays a message 402 on the user interface 400 to alert the user that the file 143-3 has been found to be malware. In the example of FIG. 6, the files 143-1 and 143-2 are not detected to be malware. Accordingly, the AMA app 213 stores the files 143-1 and 143-2 in their intended destination in the host computer 130, which is the logical drive D.

In the above embodiments, the AMA 120 is configured to perform malware scanning using computing resources (i.e., processor 201, memory 202) of the host computer 130. As can be appreciated, malware scanning may also be performed in the AMA 120 depending on the computing resources of the AMA 120. For example, the AMA 120 may be implemented with a relatively fast processor, fast and large memory, etc. Doing so would result in increased performance and effectiveness, but would also increase the manufacturing cost, complexity, and power consumption of the AMA 120. As can be appreciated, in the implementation of the AMA 120, engineering trade-offs may be made to address particular OT security requirements.

Figure 7:
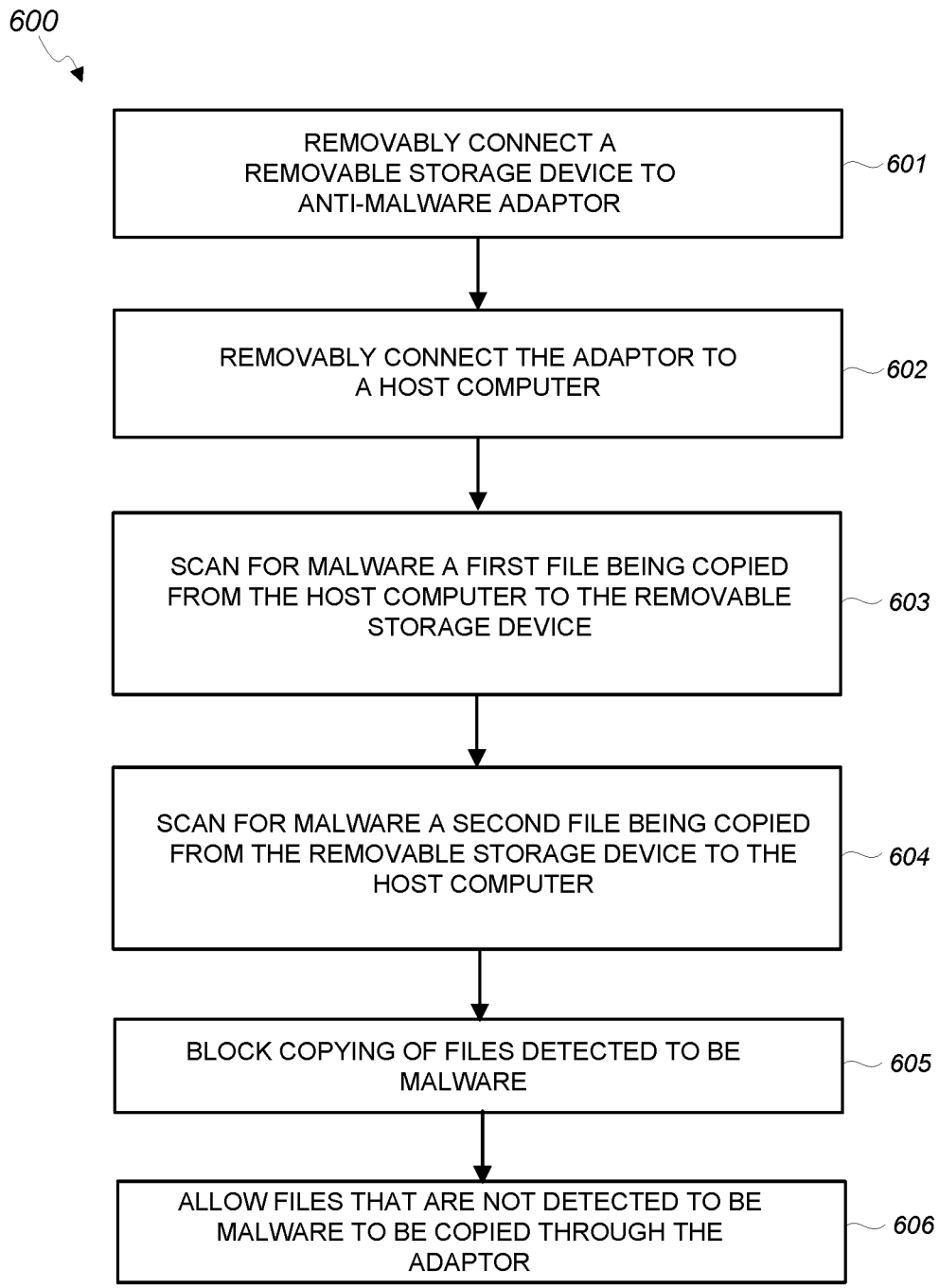
FIG. 7 shows a flow diagram of a method of scanning files being copied between a host computer and a removable storage device for malware in accordance with an embodiment of the present invention.

FIG. 7 shows a flow diagram of a method 600 of scanning files being copied between a host computer and a removable storage device for malware in accordance with an embodiment of the present invention.

In the method 600, a removable storage device is removably connected to an adaptor (step 601) and the adaptor is in turn removably connected to a host computer (step 602). A scan engine of the adaptor scans for malware a first file being copied from the host computer to the removable storage device through the adaptor (step 603). Similarly, the scan engine of the adaptor scans for malware a second file being copied from the removable storage device to the host computer through the adaptor (step 604). Any file that is detected to be malware is blocked from being copied between the removable storage device and the host computer (step 605). Blocking copying of a file includes preventing the file from being transferred through the adaptor after detecting the file in the host to be malware. Blocking copying of the file also includes preventing the file from being stored in its intended non-volatile memory storage destination in the removable storage device or the host computer. Any file that is not detected to be malware is allowed to be copied between the removable storage device and the host computer through the adaptor (step 606).

While specific embodiments of the present invention have been provided, it is to be understood that these embodiments are for illustration purposes and not limiting. As can be appreciated, many additional embodiments will be apparent to persons of ordinary skill in the art reading this disclosure.

What is claimed is:

1. An industrial control system comprising:
   an adaptor comprising a first connector and a second connector, the first connector of the adaptor being removably connected to a connector of a host computer, the adaptor comprising a non-volatile memory that stores a scan engine;
   a removable storage device comprising a first connector that is removably connected to the second connector of the adaptor, the removable storage device storing a first file; and
   the host computer that is configured to control an industrial equipment, the host computer operable to receive the scan engine from the adaptor, and to execute the scan engine to scan the first file being copied from the removable storage device to the host computer through the adaptor for malware.

2. The industrial control system of claim 1, wherein each of the first and second connectors of the adaptor is a Universal Serial Bus (USB) connector.

3. The industrial control system of claim 1, wherein the removable storage device is a USB flash memory device.

4. The industrial control system of claim 1, wherein the non-volatile memory of the adaptor comprises flash memory.

5. The industrial control system of claim 1, wherein the industrial equipment is an industrial robot.

6. The industrial control system of claim 1, wherein a second file from the removable storage device that is not detected by the scan engine to be malware is allowed to pass through the adaptor and be stored in a storage device of the host computer.

7. The industrial control system of claim 1, wherein the first file is detected by the scan engine to be malware and is blocked by the adaptor.

8. An anti-malware adaptor comprising:
   a first connector that is configured to be removably connected to a connector of a removable storage device;
   a second connector that is configured to be removably connected to a connector of a host computer;
   a non-volatile memory that stores a scan engine and an application program that are loaded and executed in the host computer; and
   a controller that is configured to translate commands received from the application program executing in the host computer into commands that operate on files stored in the removable storage device to load the files from the removable storage device into the host computer through the adaptor for scanning by the scan engine for malware in the host computer.

9. The anti-malware adaptor of claim 8, wherein the non-volatile memory comprises a flash memory.

10. The anti-malware adaptor of claim 8, wherein the first and second connectors of the anti-malware adaptor are Universal Serial Bus (USB) connectors.

11. The anti-malware adaptor of claim 8, wherein the removable storage device is a USB flash memory device.

12. The anti-malware adaptor of claim 8, wherein the host computer is a workstation of an industrial equipment.

13. The anti-malware adaptor of claim 12, wherein the industrial equipment is an industrial robot.

14. A method of copying files between a host computer and a removable storage device, the method comprising:
   loading a scan engine and an application program from an adaptor to a host computer, wherein the adaptor is removably connected to the host computer;
   executing the scan engine and the application program in the host computer;
   sending, by the application program executing in the host computer, a first command to the adaptor;
   translating, by the adaptor, the first command to a second command that operates on a first file stored in a removable storage device to load the first file into the host computer through the adaptor, wherein the removable storage device is removably connected to the adaptor;
   scanning the first file in the host computer using the scan engine; and
   allowing access to the first file in the host computer in response to the first file not being detected as malware by the scanning.

15. The method of claim 14, wherein allowing access to the first file in the host computer comprises:
   storing the first file in a storage device of the host computer.

16. The method of claim 14, further comprising:
   scanning, using the scan engine executing in the host computer, a second file being copied from the removable storage device to the host computer through the adaptor for malware; and
   blocking the second file in response to the second file being detected by the scan engine as malware.

17. The method of claim 14, further comprising:
   scanning, using the scan engine running in the host computer, a third file being copied from the host computer to the removable storage device through the adaptor for malware.

18. The method of claim 17, further comprising:
   blocking the third file in response to the third file being detected by the scan engine running in the host computer as malware.

* * * * *